United States Patent [19]

Stenudd

[11] Patent Number: 5,810,548

[45] Date of Patent: Sep. 22, 1998

[54] DEVICE FOR HANDLING OF OBJECT

[76] Inventor: Örjan Stenudd, Östanfjärden 5498, Kalix, Sweden, S-952 91

[21] Appl. No.: 702,580

[22] PCT Filed: Mar. 1, 1995

[86] PCT No.: PCT/SE95/00213

§ 371 Date: Sep. 3, 1996

§ 102(e) Date: Sep. 3, 1996

[87] PCT Pub. No.: WO95/23574

PCT Pub. Date: Sep. 8, 1995

[30] Foreign Application Priority Data

Mar. 3, 1994 [SE] Sweden .................................. 9400736

[51] Int. Cl.⁶ ........................................................ B66C 1/00
[52] U.S. Cl. .......................... 414/680; 212/255; 254/8 R; 280/42; 280/651; 414/783
[58] Field of Search ..................... 414/783, 680; 280/42, 651, 639; 212/233, 255, 259, 343; 254/8 R, 122, 124

[56] References Cited

U.S. PATENT DOCUMENTS

| | | | |
|---|---|---|---|
| 3,659,824 | 5/1972 | Johnson | ................................. 254/124 |
| 5,018,930 | 5/1991 | Hardin et al. | ........................ 254/8 R X |
| 5,451,135 | 9/1995 | Schempf et al. | ..................... 280/42 X |
| 5,577,875 | 11/1996 | Nanzai | .................................... 414/680 |

Primary Examiner—Donald W. Underwood
Attorney, Agent, or Firm—John Lezdey

[57] ABSTRACT

The invention relates to an arrangement for handling objects, such as a hospital bed, whereby the object is moved by the arrangement from a use or starting position to an uplifted working position which facilitates cleaning, servicing and the like of the object under improved ergonomical conditions. The arrangement includes a mobile frame including two frame parts. The arrangement further includes means to adjust and vary the spacing between the frame parts. Each of the frame parts carries a pivotally mounted lifting arm and maneuvering means for swinging the lifting arm between a generally horizontal starting position and an uplifted position. The lifting arm includes a hook device and a lever arm which are configured for engagement with the object to be handled.

7 Claims, 4 Drawing Sheets

DEVICE FOR HANDLING OF OBJECT

BACKGROUND OF THE INVENTION

1. Field of the Invention

The present invention relates to an arrangement for handling objects, such as hospital beds for instance, wherein the arrangement functions to move the object from a position of use/starting position to an upfolded or uplifted working position in which cleaning, servicing and like work can be performed under improved ergonomical conditions.

2. Description of the Prior Art

Nursing and ward personnel are often required to lift different objects, for instance hospital bends, in order to clean or carry out other services. This work may require the bed to be tipped up vertically or tipped onto one side in order to be able to reach the underside of the bed, for instance. This lifting work is likely to cause undue strain on the ward personnel concerned.

There is therefore an urgent need for the provision of arociliary means which will enable such objects to be handled without injuring those concerned.

SUMMARY OF THE INVENTION

The object of the present invention is to provide an effective arrangement for handling objects such as hospital beds for instance, in order to provide improved access when cleaning and performing other services, this object being achieved by the arrangement according to the invention having the characteristic features set forth in the following claims.

The inventive arrangement provides many different advantages, of which the following can be mentioned by way of example.

The handling arrangement can be brought to a collapsed parking state/storage state, in which it can be stowed away in a cupboard for instance, when the arrangement is not in use. The arrangement uses no external power supply leads or cables and can be narrowed in width so as to enable the arrangement to pass smoothly through doorways and to be moved easily from room to room. The lifting arms of the arrangement are intended to lie on top of/above the bed and do not impede subsequent cleaning and servicing operations on the underside of the bed. If required, the lifting arms can be inserted beneath a mattress on the bed, when it is not necessary to remove the mattress, and the mattress can be held secured in place by means of a resilient or elastic strap when lifting the bed. The ability to adjust the width of the arrangement enables the arrangement to be adapted to different bed types or models.

The inventive handling arrangement/bed-lifting device that enables the bed to be lifted up and positioned so that the whole of the underside of the bed can be cleaned while working in a comfortable working position, which, in turn, affords hygienic and ergonomical advantages.

The handling arrangement or bed-lifting device can thus be stowed away in a hospital word where it can be readily moved between the different rooms on the ward. It is quick and easy to clean the hospital bends. The handling arrangement is easy to manoeuvre. The bed lift is free from external power supply cables and leads and, when not in use, is parked in its storage place and connected to a battery charger for recharging of the batteries used to run the arrangement.

The inventive handling arrangement has both technical and economical advantages.

BRIEF DESCRIPTION OF THE DRAWINGS

The invention will now be described in more detail with reference to an exemplifying embodiment thereof and also with reference to the accompanying drawings, in which.

DESCRIPTION OF THE PREFERRED EMBODIMENTS

Figure 1:
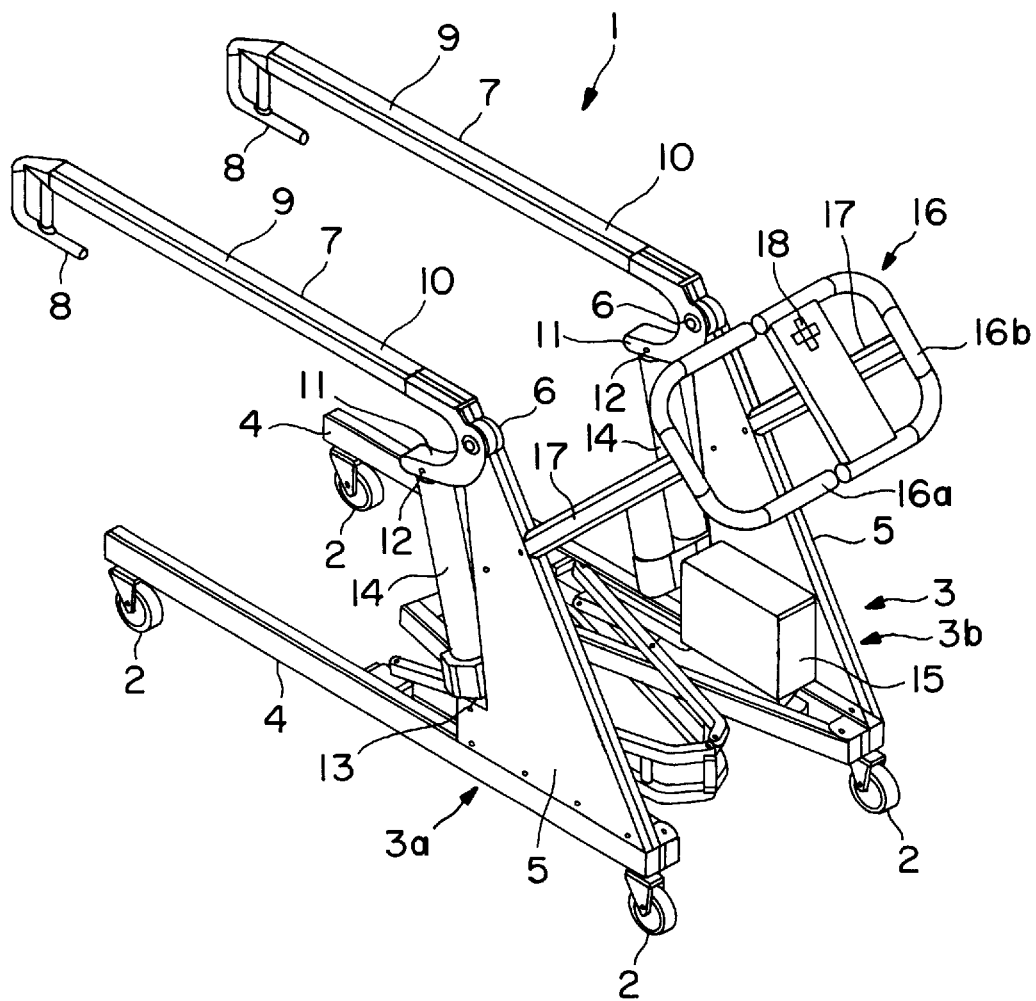
FIG. 1 is a perspective view of the inventive handling arrangement in a collapsed or folded parking state/storage state.
Figure 2:
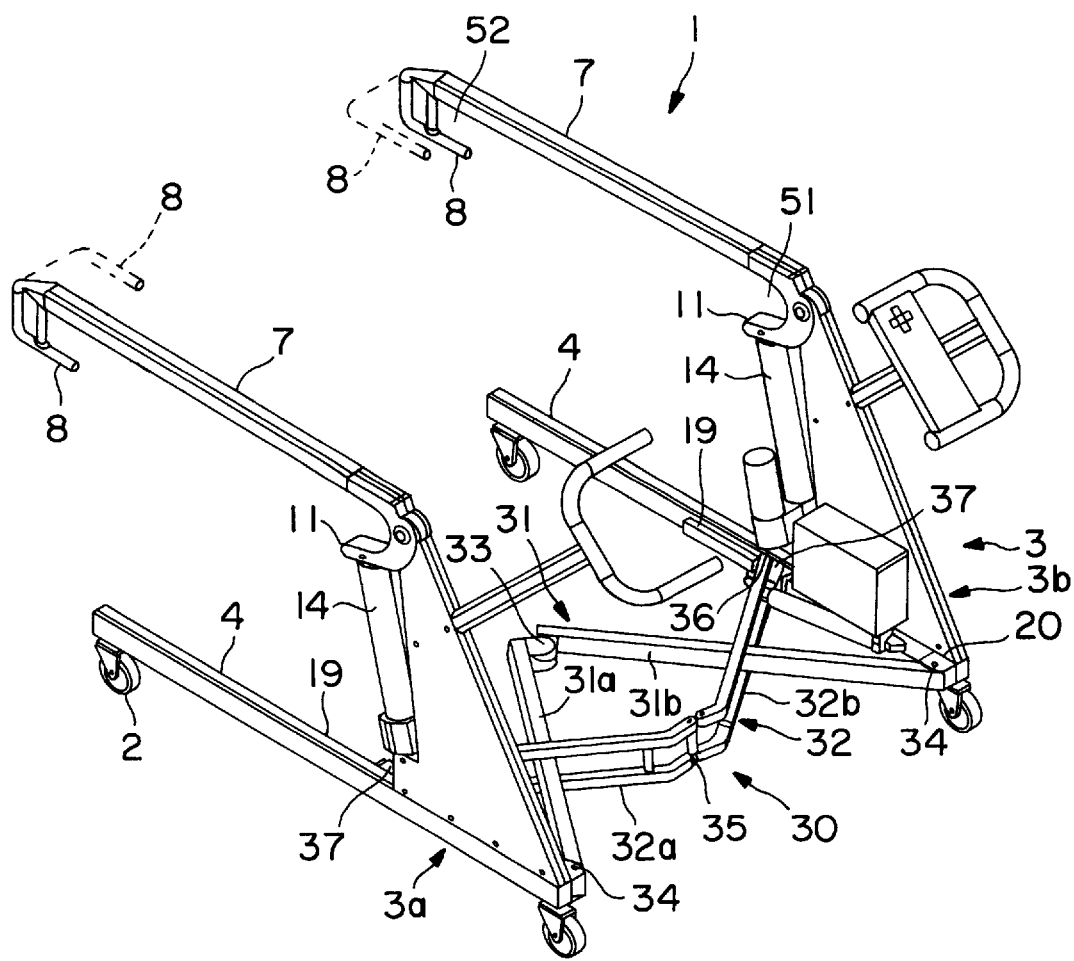
FIG. 2 is a perspective view of the inventive handling arrangement in an initial use state and shows the arrangement expanded in width.

As shown in the Figures, the inventive handling arrangement 1 includes a mobile frame 3 which is supported on wheels or casters 2 and which, in principle, is comprised of two mirror-image frame parts 3a and 3b. The casters 2 are pivotally mounted on a frame beam 4 of respective frame parts 3a, 3b. The frame part 3a and the frame part 3b also include a generally triangular side plate 5. Each side plate 5 carries at its upper end a lifting arm 7 which is pivotally mounted on a pivot journal 6. In the illustrated embodiment, the pivotally mounted lifting arm 7 is comprised of a square-section tube and the arm 7 carries at its free forward end a hood device 8 which is connected to a round-section tube 9 which fits telescopically into the square-section tube 7. An internally mounted spring 10 acts between the square-section tube 7 and the tube 9 carrying the hook 8 in a manner to hold the hook 8 drawn in against the tube 7, for instance, as illustrated in FIG. 1. The hook 8 has a square configuration at the junction region with the tube 9, therewith preventing the hook 8 from rotating relative to the lifting arm 7, whereas the tube 9, which has a round cross-section, is able to rotate inside the square-section tube 7. This enables the hook 8 to be pulled out from the lifting arm 7 to a limited extent against the action of the spring 10, therewith allowing the hook 8 to be turned between a total of four different rotary positions, by virtue of the tube 9 being able to rotate within the tube 7, said hook 8 being pulled back by the spring 10 to its withdrawn position in relation to the lifting arm 7 and therewith fixed in a selected one of said four different rotary positions. This feature is illustrated in FIG. 2, which shows in broken lines the hook devices 8 located in one alternative position of rotation.

Figure 3:
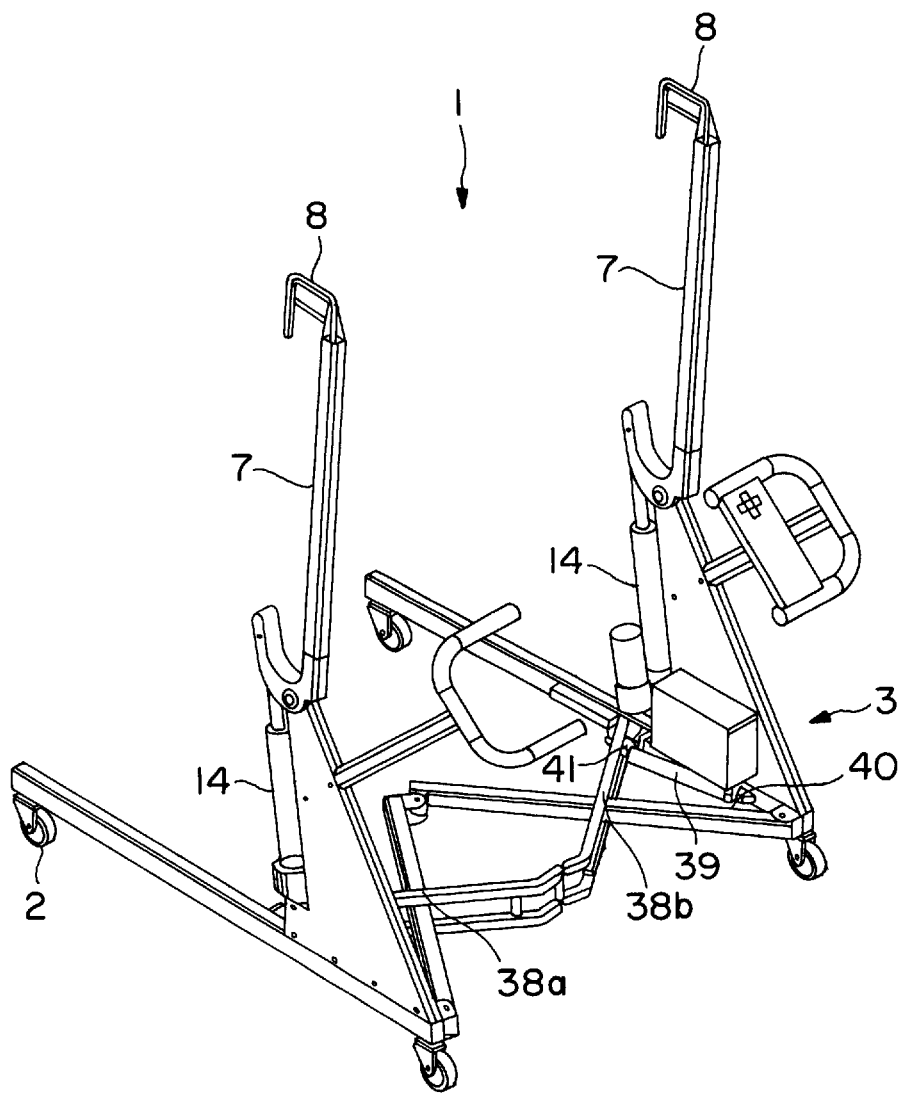
FIG. 3 illustrates the handling arrangement in a final width-expended use state.

The end of the lifting arms 7 proximal to its pivot journal includes a curved lever arm 11. A manoeuvering device 14 in the form of a so-called electromechanical manoeuvering device, e.g. a piston-cylinder device, is actively between a pivotal attachment point 12 of the lever arm 11 and a pivotal attachment point 13 of the side plate 5. When an electric current is supplied to activate the manoeuvering devices 14, the devices can be manoeuvred between the withdrawn or collapsed state shown in FIG. 1 to the linearly expanded state shown in FIG. 3, therewith causing the lifting arms 7 to be swung from the generally horizontal starting position shown in FIG. 1 to the generally vertical use position shown in FIG. 3. Each of the lifting arms 7 thus swings around a respective pivot journal 6 in conjunction with activation of the manoeuvering devices 14. The frame part 3b carries a source of electric current 15, which may have the form of a rechargeable battery pack, this current source being used to drive the manoeuvering devices 14, among other things.

The frame 3 also includes an operating handle 16 which is comprised of a first handle part 16a connected to the side plate 5 on the frame part 3a by means of a rod or bar 17, and a second handle part 16b which is connected correspondingly to the side plate 5 of the frame part 3b by means of a rod or bar 17. The second handle part 16b carries an operating panel 18 which includes the necessary electronics and an electrical connection point for connecting the electric current source 15 to mains supply for recharging purposes when so required. It will be understood that the arrangement will include electric cables and wires between the operating panel, current source and the electrically operating components, and that the arrangement is free from power cables, etc., in other respects.

Each of the frame beams 4 carries a guide rail 19, the function of which will be explained below. Mounted on the rear end of each frame beam 4 is an attachment 20, whose function will also be described below.

The inventive handling arrangement 1 also includes a device 30 by means of which the mutual spacing of the frame parts 3a and 3b can be varied, by parallel displacement. The adjustment device 30 includes a front scissor-arm combination 31 and a rear scissor-arm combination 32. The front scissor-arm combination 31 comprises two scissor-arms 31a and 31b, these arms being pivotally connected together at their front ends by means of a pivot journal 33. The rear ends of the scissor-arms 31a and 31b are pivotally connected to the attachment 20 of respective frame parts 3a and 3b, by means of pivot journal 34.

The rear scissor-arm combination 32 includes two scissor arms 32a and 32b, each of which is comprised of two mutually spaced arm elements, said arms being pivotally connected together at their respective rear ends by means of a pivot journal 35. The forward ends of respective scissor arms 32a and 32b carry a guide carriage 37 which is pivotally connected by a pivot bearing 36 and which is constructed to slide or roll guidingly along the guide rail 19 of respective frame beams 4. The scissor arms 31a and 32a are pivotally connected together essentially in the centre regions thereof by means of a pivot journal 38a. The scissor arms 31b and 32b are pivotally connected together essentially at their centre regions, by a pivot journal 38b. A manoeuvering device which in the illustrated case has the form of an electromechanical positioning device 39, e.g. a piston-cylinder device, is pivotally connected at one end to an attachment point 40, while the other end of the device is pivotally attached to an attachment point 41 on the guide carriage 37 on the frame part 3b. The attachment point 40 is provided on the frame part 3b.

When the positioning device 39 is extended to its maximum length position, in response to commands entered through the operating panel 18 and in response to electric current supplied from the electric current source 15, the guide carriage 37 is caused to slide or roll along the guide rail 19 of the frame part 3b, at the same time as the guide carriage 37 in engagement with the corresponding rail 19 on the frame part 3a also slides/rolls on said rail, therewith causing the frame parts 3a and 3b to move towards one another so that the frame parts 3a and 3b of the handling arrangement 1 will be located relatively close to one another in the maximum length expanded state of the manoeuvering device 39 as illustrated in FIG. 1. When the manoeuvering device 39 instead is operated so as to shorten the length of the device, the guide carriages 37 will slide or roll rearwardly on the guide rails 19, so as to bring the frame parts 3a and 3b away from each other, therewith widening handling arrangement 1 to the expanded width shown in FIG. 2. It will be seen that the width of the handling arrangement 1 can be adjusted smoothly and continuously by activating the manoeuvering device 39, so as to enable the pivotally mounted lifting arms 7 to be spaced apart to a desired extent when using the handling arrangement and therewith coact with the object to be lifted in a desired manner.

When the inventive handling arrangement 1 is to be used to lift a hospital bed for instance, it will, of course, be realized that the vertical position of the pivotally mounted lifting arms 7 and the distance between the hooks 8 and the curved lever arms 11 are adjusted to the dimensions and geometry of the hospital bed concerned. Naturally, the frame beams 4 must have a length which will impart sufficient stability to the handling arrangement 1 for each working situation, and, of course, the remaining components must also be dimensioned to manage each working situation.

The inventive handling arrangement 1 is used in the following way.

Figure 4:
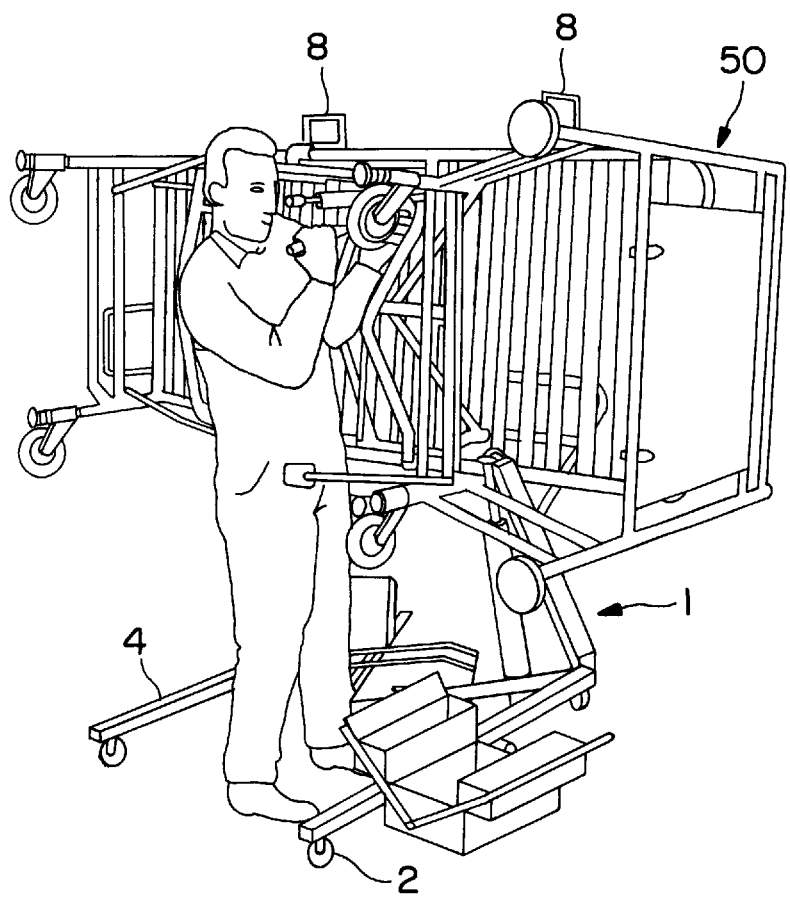
FIG. 4 is a perspective view which shows the handling arrangement in the final state of use shown in FIG. 3, with the handling arrangement supporting a hospital bed in a manner which enables the underside of the bed to be reached for cleaning, servicing or repair purposes.

Assume that the handling arrangement 1 is collapsed initially in its parking/storage state as shown in FIG. 1. When wishing to use the arrangement, the arrangement is moved on its casters with the aid of the operating handle 16a and 16b to the vicinity, for instance, of a hospital bed to be lifted. The manoeuvering device 39 is then activated so as to widen the distance between the frame parts 3a and 3b in the aforedescribed manner, until the lifting arms 7 are spaced apart at a distance suitable for the bed to be lifted. The hooks 8 are now turned or have previously been turned to e.g. the position shown in FIG. 2 in broken lines, by temporarily drawing out the hooks 8 and turning the same in the aforedescribed manner. The handling arrangement 1 is now moved forwards so that the lifting arms 7 are located above the bottom of the bed and so that the frame beams 4 are located partially beneath the bed 50. The handling arrangement 1 is moved forwards until one long side of the bed 50 is located in a space 51 on the curved lever arm 11. The hooks 8 are now pulled out and returned to the position of rotation shown in full lines in FIG. 2, wherewith the other long side edge of the bed 50 will be located in a space 52 defined by the respective hooks 8. The pivotally mounted lifting arms 7 are now in firm holding engagement with the bottom of the bed, through the medium of the hooks 8 and the lever arms 11. The length of the manoeuvering device 14, is now extended by appropriate manipulation of the operating panel 18, therewith causing the lifting arms 7 to be swung up from the starting position shown in FIG. 2 to the upwardly swung terminal position shown in FIG. 3, wherewith the bed 50 is lifted from the floor and accompanies the lifting arms to an upwardly swung position, as illustrated in FIG. 4. As will be seen from FIG. 4, the whole of the underside of the bed 50 is now accessible for cleaning purposes and/or other servicing purposes, without the lifting arms 7 having any disturbing influence, since the lifting arms are located on the upper side of the bed. The bed 50 is replaced onto the floor by commensurately manipulating the operating panel 18, so as to shorten the length of respective manoeuvering devices 14 and therewith cause the arms 7 to return to the horizontal position shown in FIG. 2 and lowering the bed 50 onto the floor. The hooks 8 are then released from their engagement with the long side edges of the bed and are e.g. turned to the position shown in broken lines in FIG. 2, whereafter the handling arrangement 1 can be backed out and removed from the bed 50. If desired, the manoeuvering device 39 can be activated to narrow the width of the handling arrangement 1 and bring the arrangement to the parking state/storage state shown in FIG. 1, and so on.

It will be understood that the illustrated and described inventive handling arrangement 1 can be modified in various ways within the scope of the inventive concept. For instance, certain components can be replaced with functionally equivalent components of another kind. For instance, as a non-limiting example, the manoeuvering devices 14 and 39 and also other components may have a form other than earlier described.

It will also be understood that the pivotally mounted lifting arms 7, the hooks 8 and the lever arms 11 may be given a design commensurate with the configuration/construction of the object with which they shall coact in lifting the object.

The lifting arms 7, the hooks 8 and the lever arms 11 of the handling arrangement 1 may, of course, be exchangeable, and the frame 3 may be constructed so that the journal bearing 6 of the lifting arms can be located at different height levels.

The invention is therefore not restricted to the illustrated and described embodiments thereof, since changes and modifications can be made within the scope of the following Claims.

I claim:

1. An arrangement for handling and moving an object from a use or starting position to an uplifted working position for cleaning and servicing said object; said arrangement comprising a mobile frame having at least two frame parts spaced apart from one another; means connected between said two frame parts for adjusting said spacing between said frame parts; said adjusting means having a front scissor arm combination comprising at least two arms and a rear scissor arm combination comprising at least two arms mutually connected by journal bearings and each of said frame parts including a pivotally mounted lifting arm and a first means for maneuvering said lifting arm between a substantially horizontal position and a substantially uplifted position; each of said lifting arms having a hook device mounted on a free end and a lever arm positioned at the pivoting end, said hooks and lever arms being configured for engagement with said objects, and a second means for maneuvering the position of said front and rear scissor arm combinations.

2. The arrangement according to claim 1, wherein said at least two arms of said front scissor-arm combination includes at least two pivotally connected scissor arms, each of said scissor arms being pivotally connected at a free end to each of said frame parts.

3. The arrangement according to claim 1, wherein said at least two arms of said rear scissor-arm combination includes at least two pivotally connected scissor arms, each of said scissor arms being pivotally connected at a free end to guide carriages; and wherein said guide carriages slide or roll along a guide rail on each of said frame parts.

4. An arrangement for handling an object, such as a hospital bed, whereby the object is moved by the arrangement from a use position/starting position to an uplifted working position which facilities cleaning, servicing and the like of said object under improved argonomical conditions, characterized in that the arrangement includes a mobile frame comprised of two frame parts; in that the arrangement includes means connected between said two frame parts which function to adjust and to vary the spacing between said frame parts; and in that each of the frame parts carries a pivotally mounted lifting arm and a manoeuvering device by means of which the lifting arm is swung between a generally horizontal starting position and an uplifted position, each of said lifting arms having a hook device mounted on a free end, said hook device having a tube telescopically connected to said lifting arm and movable to different positions therein, each of said lifting arms having a lever arm positioned at the pivoting end, said hook device and said lever arm are configured for engagement with said object.

5. The arrangement according to claim 4, wherein said maneuvering for pivoting the lifting arm device is adapted to act between each said lever arm and each of said frame parts.

6. The arrangement according to claim 4 further comprising an additional maneuvering device connected between said adjusting means and at least one of said frame parts for changing a position of said adjusting means.

7. The arrangement according to claim 4, wherein said frame parts are mounted on wheels or casters.

* * * * *